US006543113B1

(12) United States Patent
Khurana

(10) Patent No.: US 6,543,113 B1
(45) Date of Patent: Apr. 8, 2003

(54) TOOLING COMPONENTS FOR CRANKSHAFT SEAL REMOVAL AND INSTALLATION

(75) Inventor: Ram B. Khurana, Columbus, IN (US)

(73) Assignee: Cummins Engine Company, Inc., Columbus, IN (US)

( * ) Notice: Subject to any disclaimer, the term of this patent is extended or adjusted under 35 U.S.C. 154(b) by 0 days.

(21) Appl. No.: 09/551,820

(22) Filed: Apr. 18, 2000

(51) Int. Cl.[7] .......... B23P 19/02

(52) U.S. Cl. .......... 29/235; 29/240; 29/258; 29/270; 29/402.08; 29/402.02

(58) Field of Search .......... 29/263, 264, 235, 29/240, 270, 898.07, 898.08, 426.5, 402.02, 402.08, 256, 258, 259, 888.01, 402.03, 6.01; 277/309, 551; 206/318, 319, 335

(56) References Cited

U.S. PATENT DOCUMENTS 3,564,696 A * 2/1971 Shepanski .......... 29/235
3,651,557 A 3/1972 Bagley
3,755,875 A 9/1973 Staab
3,909,916 A 10/1975 Neff et al.
4,213,235 A 7/1980 Kemmerling
4,551,898 A 11/1985 Provost
4,649,618 A * 3/1987 Harrison .......... 29/235
4,662,050 A 5/1987 Bryce
5,052,695 A * 10/1991 Curtis .......... 29/235
5,349,736 A * 9/1994 Rubino et al. .......... 29/426.5
5,692,282 A * 12/1997 Baca .......... 29/235
5,709,018 A * 1/1998 Dugan .......... 29/235
6,065,198 A * 5/2000 Vitous et al. .......... 29/270

* cited by examiner

*Primary Examiner*—Gregory M. Vidovich
*Assistant Examiner*—T. Nguyen
(74) *Attorney, Agent, or Firm*—Woodard, Emhardt, Naughton, Moriarty & McNett LLP

(57) ABSTRACT

A kit of tooling components for use in facilitating the removal as well as the installation of a crankshaft seal includes a housing assembly which is constructed and arranged for attachment to a crankshaft seal during the removal procedure and for pushing the crankshaft seal into position during the installation procedure. The kit further includes a guide pin which is constructed and arranged for insertion through the crankshaft seal and into one of the crankshaft seal mounting holes in order to establish proper alignment for the crankshaft seal as it is pulled off during the removal procedure and as it is pushed on during the installation procedure. The kit further includes a plurality of self-tapping screws which are used during the removal procedure for attaching the housing assembly to the crankshaft seal. The housing assembly includes a housing, a support, and a drive screw, and during the removal procedure, the support is attached to the end of the crankshaft and the drive screw is used to initially push the housing against the crankshaft seal and thereafter pull the crankshaft seal from its position. Included as part of the disclosure is a method of removing a crankshaft seal by use of the kit of tooling components as well as a method of installing a crankshaft seal using basically the same kit of tooling components.

13 Claims, 11 Drawing Sheets

TOOLING COMPONENTS FOR CRANKSHAFT SEAL REMOVAL AND INSTALLATION

BACKGROUND OF THE INVENTION

The present invention relates in general to the removal and installation of crankshaft seals which are associated with high horsepower diesel engines. More specifically, the present invention relates to tooling components which are used to facilitate the removal and installation of such crankshaft seals including the thin metallic wear sleeve typically associated with such seals. While being a time saver, the tooling and method of the present invention are intended to reduce the risk of damage during removal and during installation of the crankshaft seal.

At the present time, high horse power diesel engines are typically fitted with a crankshaft seal assembly that includes the actual sealing member and a thin metallic wear sleeve. It is important to retain the desired level of lubricating fluid within the engine so that critical components will operate efficiently and with a minimum of wear to enhance engine longevity. It is therefore important to try and prevent the loss of fluid from critical areas within and around the engine and to prevent the loss of fluid from in and around operating components of the engine.

The manner in which the crankshaft is mounted within the engine and the need to service the crankshaft, including major overhaul work and repair, necessitates access to the crankshaft and thus an interface between the crankshaft ends and the corresponding housing. This interface at each end of the crankshaft needs to be sealed so as to prevent fluid leakage through this interface. The corresponding "housing" which receives the crankshaft is actually a gear cover at one end and a flywheel housing at the opposite end. Since the tooling components and method of the present invention are equally applicable to either the front crankshaft seal or the rear crankshaft seal, reference will be made herein, in the alternative, to both the gear cover and the flywheel housing. As indicated, since there is a corresponding interface which needs to be sealed at the front of the crankshaft as well as at the rear of the crankshaft, the present invention is directed to and applicable for both locations. The detailed description of the present invention which follows is directed to the front crankshaft seal (assembly) but the procedures (and apparata) for the rear crankshaft seal are the same. While the seal assembly which is typically used to establish a suitable fluid seal at the crankshaft and housing interface for high horsepower diesel engines includes a sealing member and a thin metallic wear sleeve, the description of the present invention which follows refers only to the crankshaft "seal". It is to be understood that in this context the "seal" refers to this seal assembly and not just to the sealing member portion of the two-piece seal assembly.

Whenever the crankshaft needs to be serviced, such as for overhaul, repair, or replacement, the front and rear seals need to be removed. Even if there is no intended servicing of the crankshaft, the front and rear seals require periodic maintenance which involves removal of the seals. While cleaning and replacement of the old seals is one option, the more common practice is to discard the old crankshaft seals and then install new crankshaft (oil) seals. The alignment of the seals into the interface to be sealed is critical and the fit is closely toleranced. As such, removal and installation of the front and rear crankshaft (oil) seals, whether or not including the thin metallic wear sleeve, presents a challenging task. The importance of achieving and maintaining positional accuracies means that the removal and installation procedures can be facilitated by tooling components and fixtures. Another concern is that damage to the seal or housing surface can occur and this would be seen in leakage past the seal location. If the crankshaft is not correctly positioned, leakage can occur and leakage for any reason represents an unnecessary expense. A suitable tooling fixture and/or tooling components for use in removal and installation of crankshaft seals can also save time and result in an easier and safer procedure.

The present invention provides a kit of tooling components which includes cooperating hardware in order to facilitate the safe, fast, and easy removal of front and rear crankshaft seals. The tooling kit (tooling components) of the present invention function to support, guide, and remove the crankshaft seal during the removal procedure. These same tooling components function to support, guide, and drive the crankshaft seals back into position at their correct locations during the installation procedure. As will be described herein, removal of the crankshaft seals by means of the present invention involve a removal procedure that uniformly pulls the crankshaft seal away from the housing in a balanced and uniform manner such that there is no undesirable deflection or distortion of the seal. When installing a new crankshaft seal, the tooling components of the present invention are used to align and push the crankshaft seal (with or without the wear seal) into position with a uniform force applied at the center which eliminates any realistic chance of cocking or damage to the seal. The series of steps that comprise the removal procedure are basically the same series of steps, albeit in reverse order, which comprise the installation procedure according to the present invention. The only difference between the installation and removal procedures is the need to connect the crankshaft seal to the tooling fixture when the crankshaft seal is being pulled off. As will be clear from the description which follows, when a new crankshaft seal is being installed, the same tooling fixture is able to push the crankshaft seal into position, precluding the need to physically connect the crankshaft seal to the tooling fixture.

As will be clear from the following description, the present invention improves the removal and installation procedures for front and rear crankshaft seals in a novel and unobvious manner providing an easier procedure and one which is safer and faster to perform.

SUMMARY OF THE INVENTION

A kit of tooling components for use in facilitating the removal of a crankshaft seal wherein the kit is also suitable to facilitate the installation of a crankshaft seal according to one embodiment of the present invention comprises a housing assembly for attachment to a crankshaft seal during a removal procedure, a guide pin for insertion through a crankshaft seal and for alignment of the crankshaft seal as it moves away from the crankshaft during a removal procedure and for alignment as a crankshaft seal is being installed and a plurality of screws for attaching the housing assembly to the crankshaft seal which has been selected for removal.

In a related embodiment of the present invention, a method of removing a crankshaft seal from its installation site within a housing and around one end of a crankshaft is disclosed. The method of removing begins with the step of providing a kit of tooling components which includes a housing assembly, a guide pin, and a plurality of screws. The housing assembly includes a ring portion with a plurality of holes, a support plate, a support, and a drive screw. After removing the plurality of screws which mount the crankshaft seal in position, the guide pin is inserted through one of the vacant holes in the crankshaft seal into one of the vacant mounting holes. The next step is to attach the support to the crankshaft and then rotate the drive screw in a counterclockwise direction in order to advance the ring portion against the crankshaft seal. Once these two components are in contact, they are attached to one another by using the plurality of screws. Next, the drive screw is rotated in a clockwise direction in order to pull the crankshaft seal away from the end of the crankshaft. The final step in the removal procedure is to remove the plurality of screws so as to separate the crankshaft seal from the ring portion.

In a still further related embodiment of the present invention, a method of installing a crankshaft seal is disclosed. The installation procedure basically involves the same steps of the removal procedure, though in reverse order. The only significant difference is that the plurality of screws do not need to be used to attach the crankshaft seal to the ring portion since the ring portion will actually be pushing against the seal rather than trying to pull on the seal.

One object of the present invention is to provide a kit of tooling components which facilitate an improved removal procedure for a crankshaft seal and an improved installation procedure for a crankshaft seal.

Related objects and advantages of the present invention will be apparent from the following description.

DESCRIPTION OF THE PREFERRED EMBODIMENT

Figure 1:
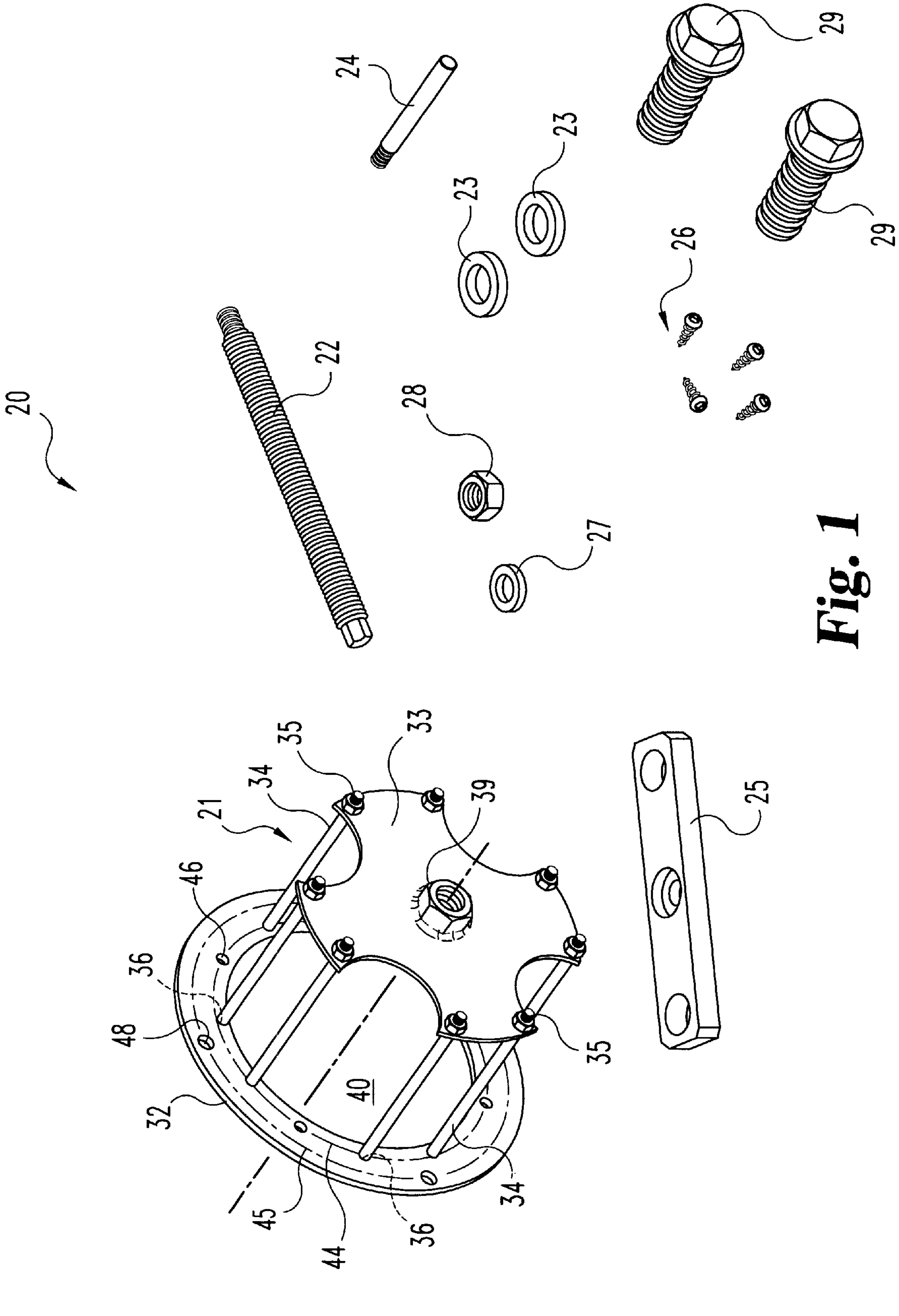
FIG. 1 is a perspective view of a tooling component kit for removal and installation of crankshaft seals according to a typical embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1, there is illustrated a tooling kit 20 which is designed to be used for the installation and removal of crankshaft front and rear (oil) seals. Kit 20 includes a housing 21, drive screw 22, two spacers 23, guide pin 24, support 25, four self-tapping screws 26, flat washer 27, hex nut 28, and two cap screws 29. While four screws 26 are required for each procedure of removing the crankshaft seal (either front or rear), none of the screws 26 are required for installation of either crankshaft seal since the seal will be pushed into position. Since the screws 26 which are used for the removal procedure are typically discarded, it is recommended that kit 20 include a package of at least fifty such screws so that a number of removal procedures can be performed without having to restock kit 20. All of the other items which comprise kit 20 are considered to be durable items which are not put in the category of consumables and are reusable for numerous procedures. Also included as part of kit 20, although not illustrated, is an instruction manual for using the components of kit 20 during the installation and removal of front and rear crankshaft seals.

Figure 2:
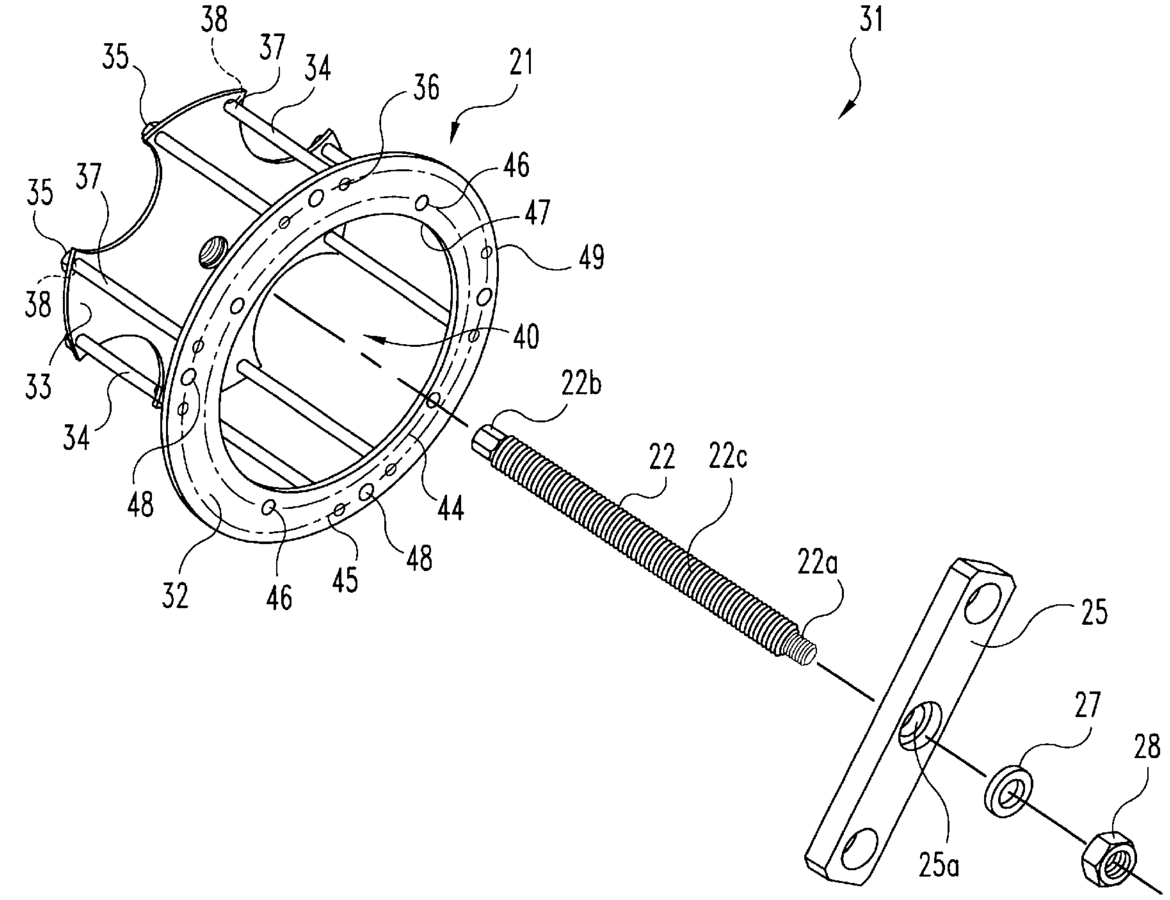
FIG. 2 is an exploded view of the components comprising a housing assembly according to the present invention.

In practice, the housing 21, drive screw 22, support 25, washer 27, and nut 28 are preassembled (i.e., factory installed), in the manner illustrated in the exploded view form of FIG. 2. One reason for this approach is that this assembly does not need to be disassembled. This assembly is referred to herein as housing assembly 31.

Drive screw 22 is externally threaded at one end 22*a* and has a hex-stud shape at the opposite end 22*b*. Washer 27 and nut 28 are assembled onto the end of a body portion 22*c* adjacent end 22*a* which extends beyond the outer surface of support 25. The body portion 22*c* is disposed between the two ends and is externally threaded. The support 25 has a counterbore 25*a* and this is used to attach the support 25 to end 22*a* by washer 27 and nut 28. The housing 21 includes an open ring 32 at one end and a support plate 33 at the opposite end. A series of eight studs 34 and eight hex nuts 35 are used to secure the ring and plate together. Each stud 34 has an externally-threaded tip which threads into a corresponding internally-threaded hole 36 in ring 32. The opposite end 37 of each stud 34, also externally-threaded, extends through a corresponding hole 38 in plate 33 and receives one hex nut 35. The center portion of plate 33 includes an anchor nut 39 which is welded to plate 33. The longitudinal axis of nut 39 is coincident with the circular centerline of opening 40 as defined by ring 32 as well as coincident with the geometric center of the two concentric bolt circles 44 and 45 which are disposed in ring 32. The inner bolt circle 44 includes four holes 46 which are positioned adjacent inner edge 47 of ring 32. The outer bolt circle 45 includes four holes 48 which are positioned adjacent the outer edge 49 of ring 32.

Figure 5:
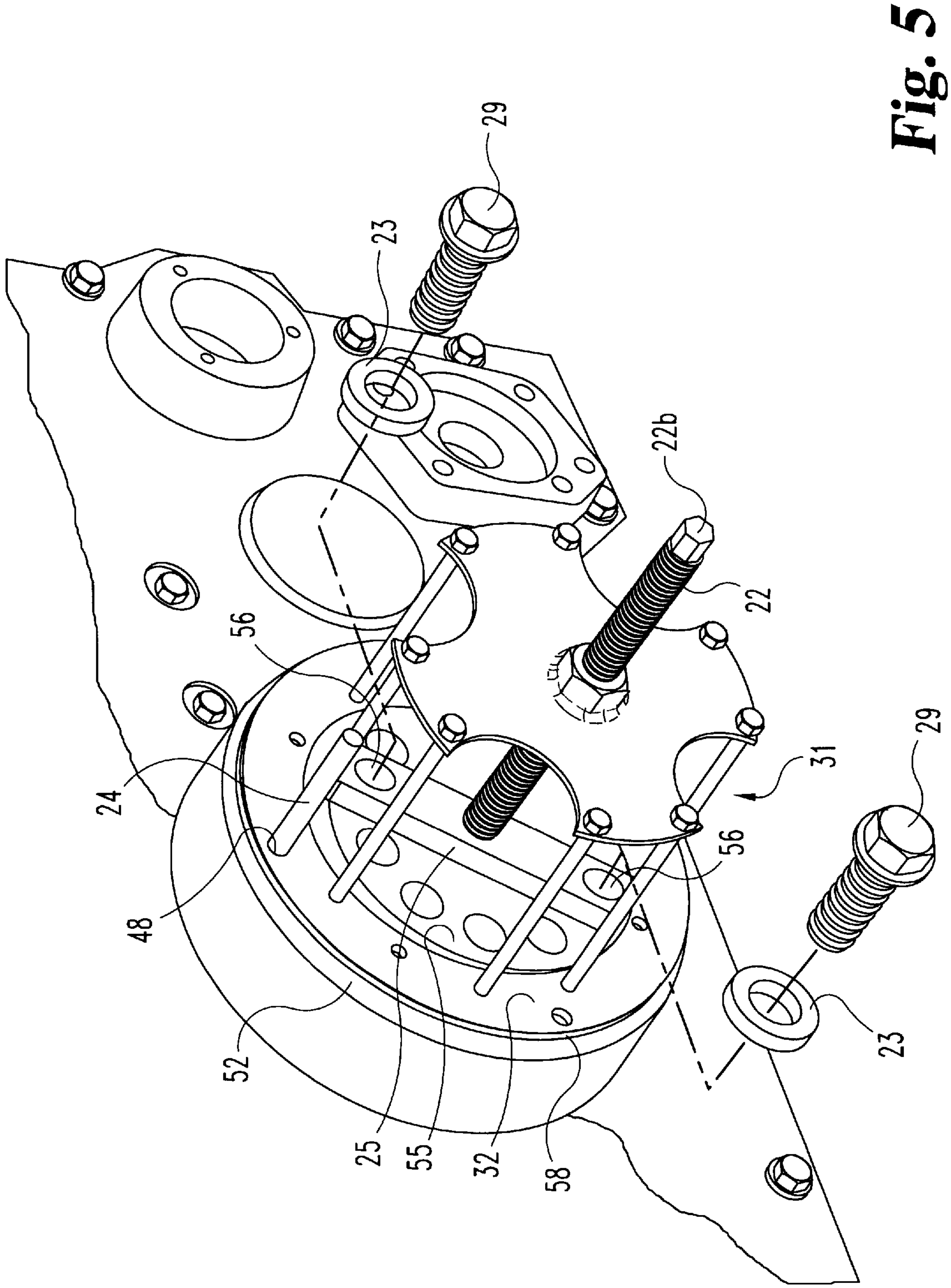
FIG. 5 is a partial, perspective, diagrammatic view of additional steps associated with the removal procedure according to the present invention.

Drive screw 22 is threaded through anchor nut 39 so that the hex-stud end 22*b* extends beyond the surface of plate 33 (see FIG. 5). Support 25 has a length which is sized to fit through opening 40 while coplanar therewith. The counterbored hole 25*a* is sized in order to recess the flat washer 27 and, at a minimum, a portion of nut 28 within support 25. After assembly, support 25 rotates freely relative to drive screw 22.

The removal procedure which is described hereinafter for the front crankshaft seal is both applicable to and the same for the rear crankshaft seal. Additionally, the installation procedure is in effect nothing more than the reverse order of steps used for the removal procedure. The only significant difference between the two procedures is that removal of the crankshaft seal 52 requires connecting the crankshaft seal to ring 32 with self-tapping screws 26 so that, as the ring is pulled away from the crankshaft, the crankshaft seal will come with the ring. In the reverse direction, when installing a new crankshaft seal, the ring merely pushes against the crankshaft seal and this procedure does not require actual connection between the crankshaft seal and the ring, and self-tapping screws are not required.

Figure 3:
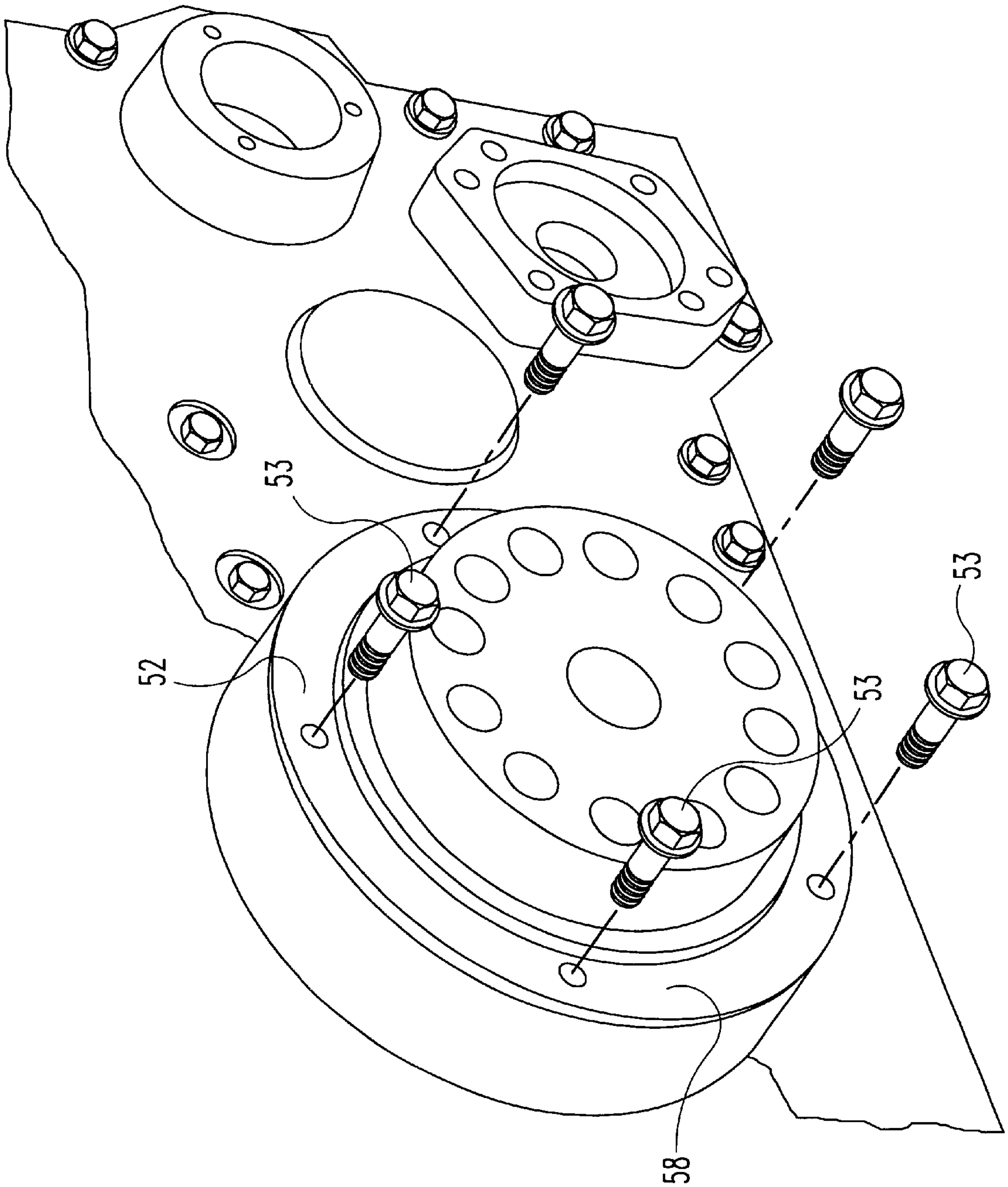
FIG. 3 is a partial, perspective, diagrammatic view of a crankshaft seal as positioned around one end of a crankshaft and mounted against a corresponding housing.
Figure 4:
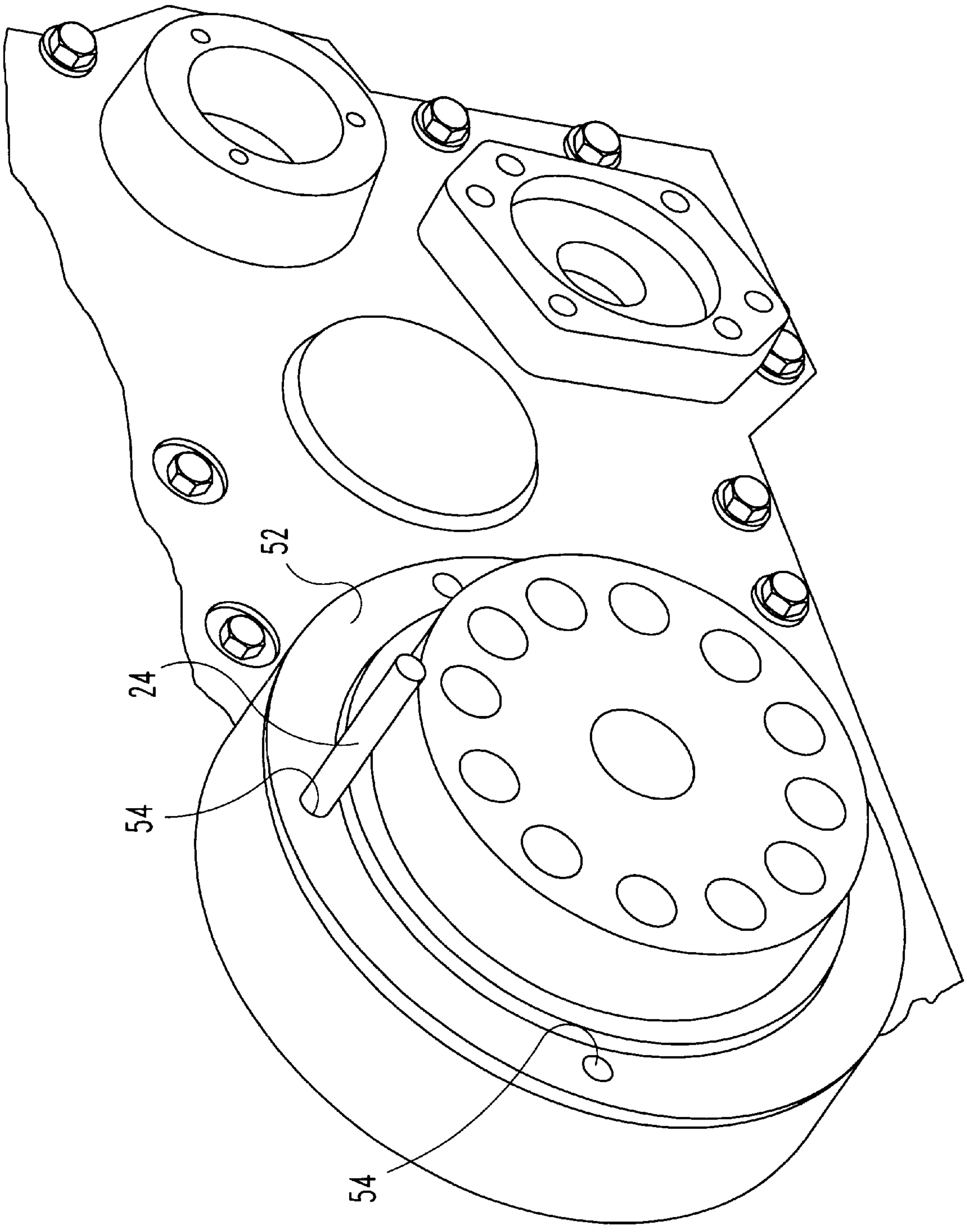
FIG. 4 is a partial, perspective, diagrammatic view of the FIG. 3 crankshaft seal and showing one step in the removal procedure.
Figure 10:
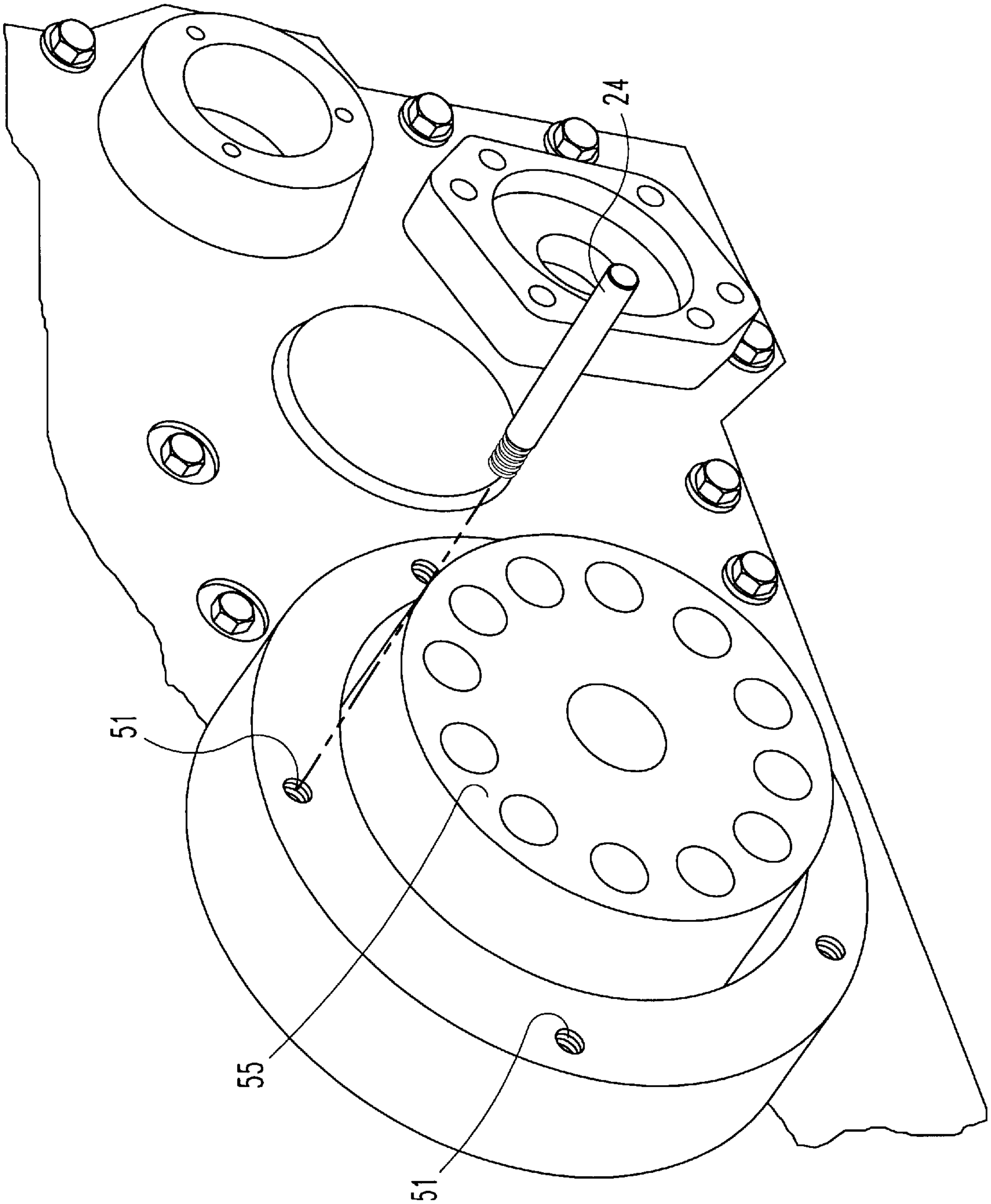
FIG. 10 is a partial, perspective, diagrammatic view showing one of the steps in the installation procedure for a new crankshaft seal according to the present invention.

The removal procedure has been selected as the starting point because this is typically where the repair or overhaul begins. The worn or damaged part is first removed and then a new part is installed. With reference to FIG. 3, the first step in the removal procedure for the front crankshaft seal 52 is to remove the five crankshaft seal mounting cap screws 53 from their tapped holes 51 in the housing (see FIG. 10). The next step (see FIG. 4) is to insert guide pin 24 through one of the five mounting holes 54 in the crankshaft seal 52 and into the corresponding tapped hole 51. The threaded tip of guide pin 24 mates with the threads of hole 51. Next, using the outer bolt circle 45, line up the housing assembly 31 with guide pin 24, such that the guide pin 24 extends through one of the holes 48 (see FIG. 5). With the housing assembly properly aligned, the next step involves attachment of the housing assembly 31 to the crankshaft 55. This attachment is achieved by using the two clearance holes 56 located in support 25. The mounting hardware which is used includes the use of two of the existing vibration damper adapter mounting cap screws, if those screws are present. If not, then the two cap screws 29 and the two spacers 23, which are provided as part of kit 20, are used. After the two cap screws 29 are tightened into position, the next step is to rotate drive screw 22 in a counterclockwise direction using the hex-stud end 22*b*. This counterclockwise rotation continues until the ring 32 of the housing assembly 31 sets tight up against the outer face 58 of the crankshaft seal 52.

Figure 6:
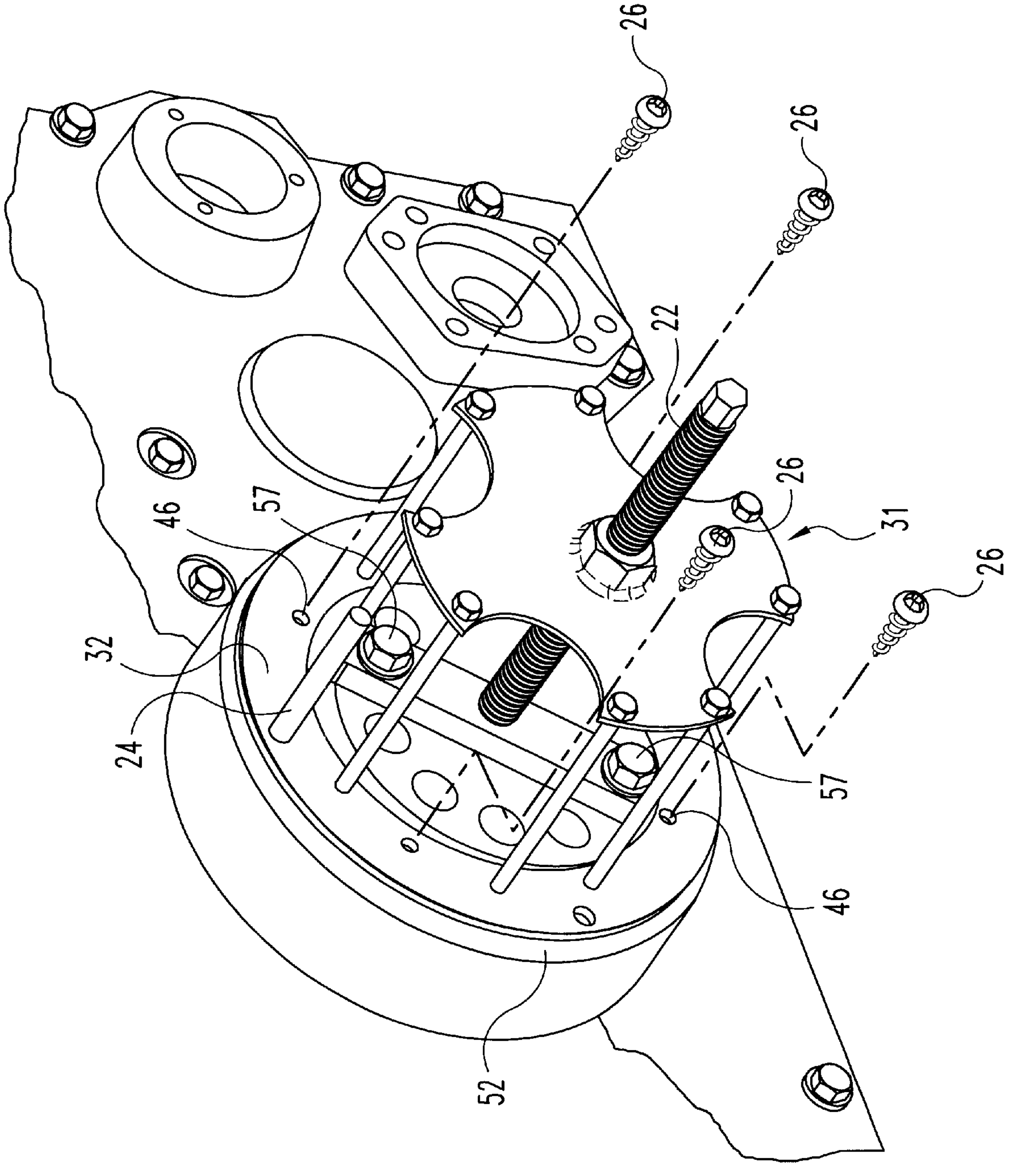
FIG. 6 is a partial, perspective, diagrammatic view of additional steps associated with the removal procedure according to the present invention.
Figure 7:
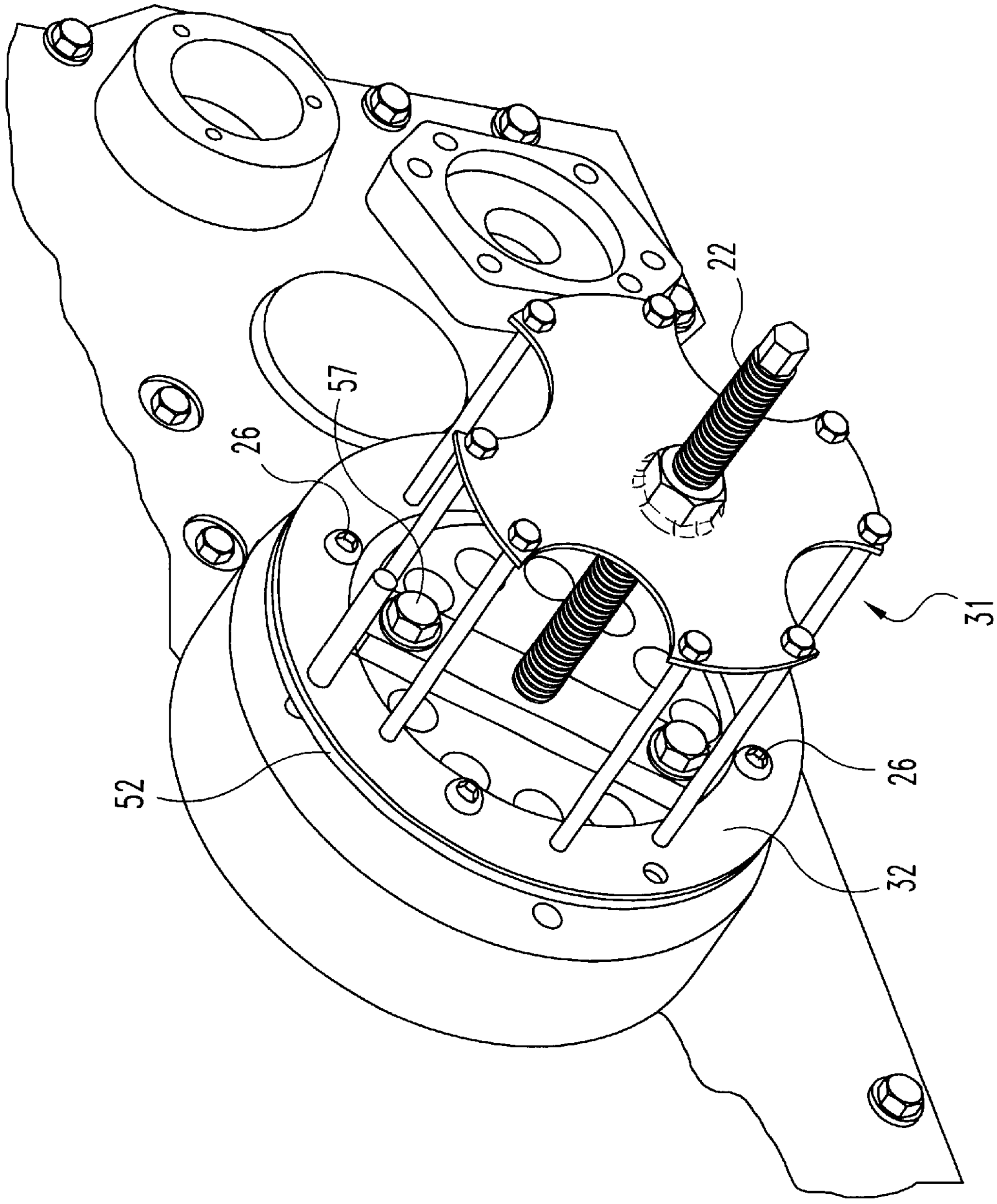
FIG. 7 is a partial, perspective, diagrammatic view of additional steps associated with the removal procedure according to the present invention.
Figure 8:
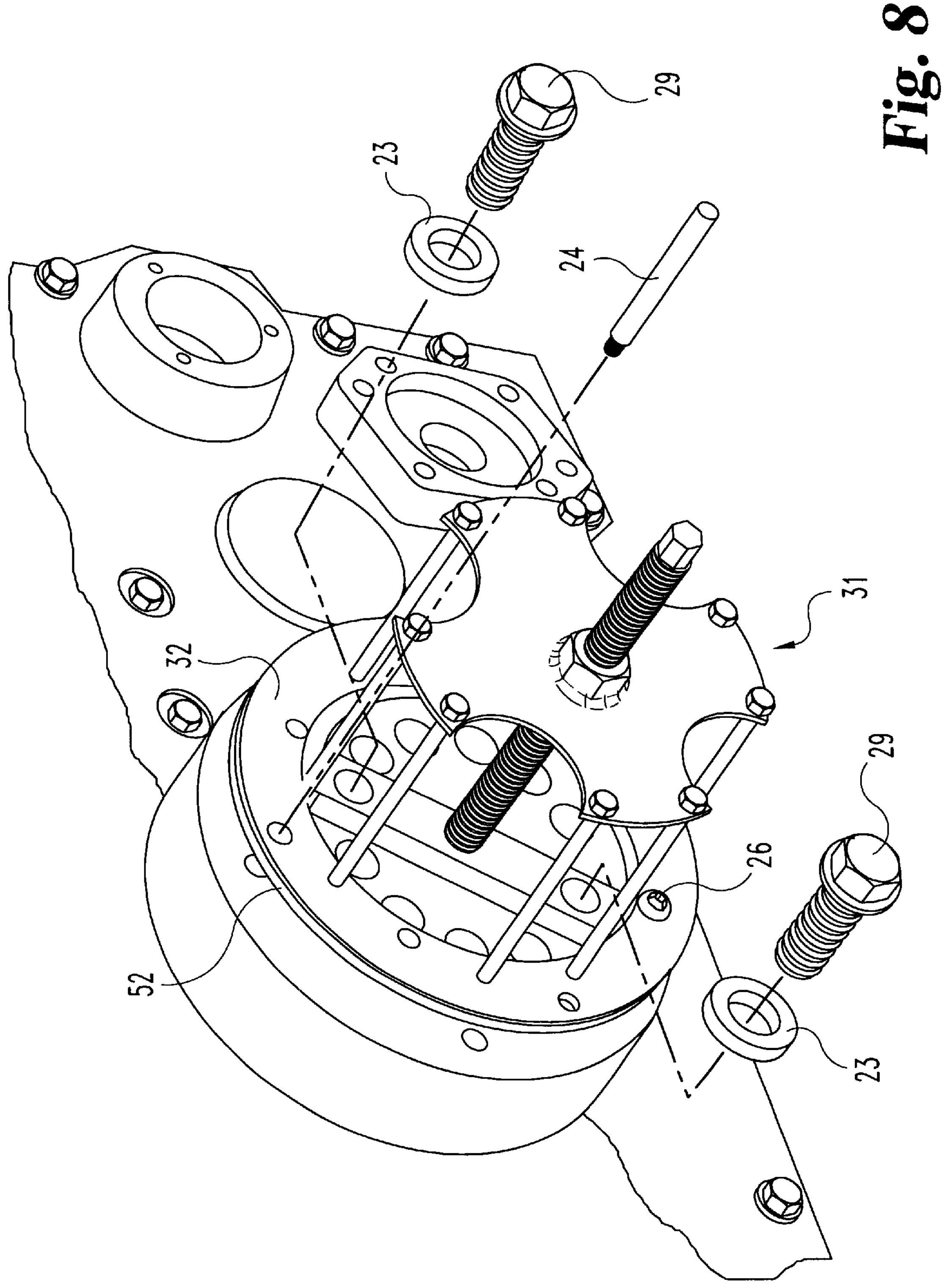
FIG. 8 is a partial, perspective, diagrammatic view of additional steps associated with the removal procedure according to the present invention.
Figure 9:
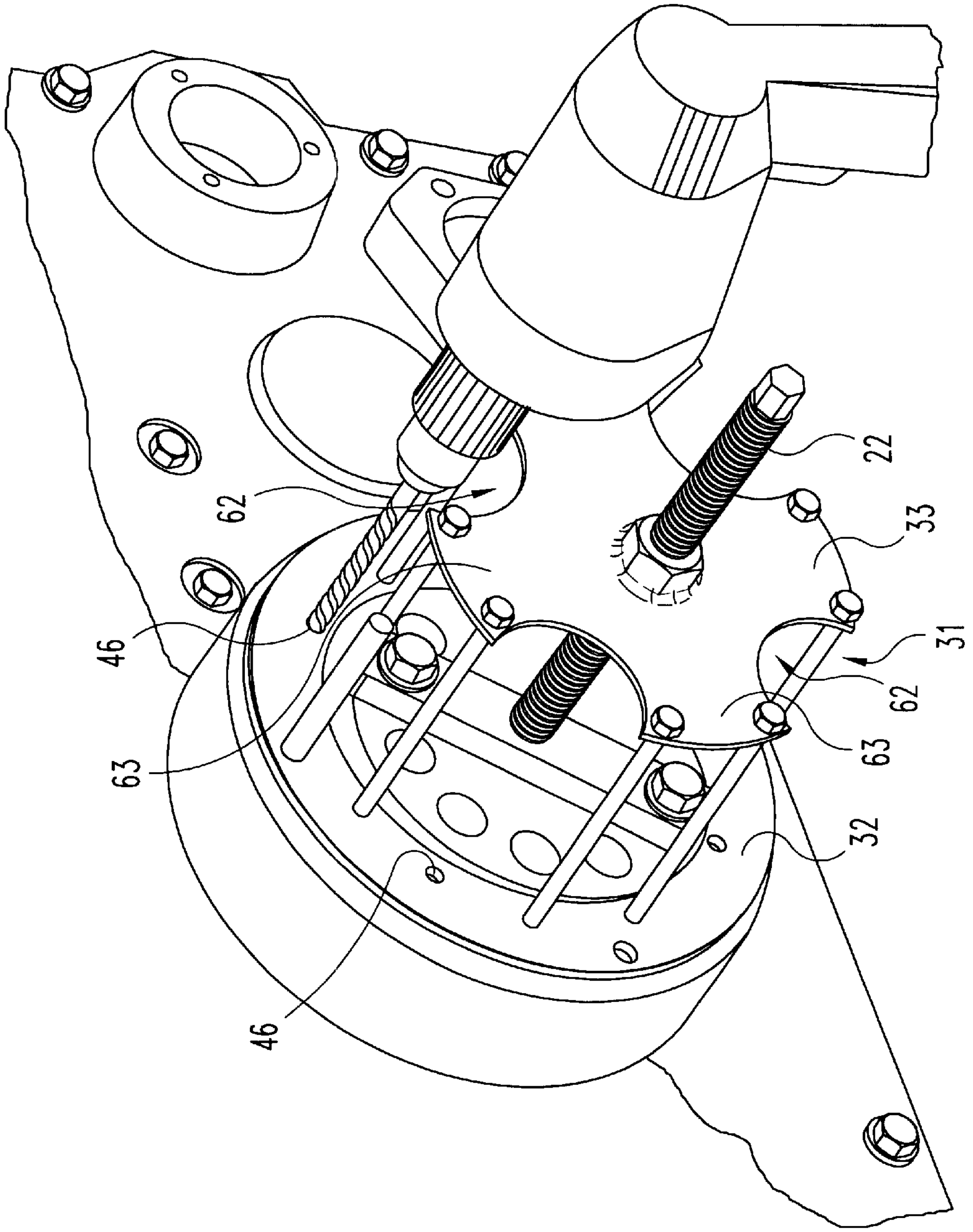
FIG. 9 is a partial, perspective, diagrammatic view of additional steps associated with the removal procedure according to the present invention.

The next step simply involves inserting (threading) the four, self-tapping or self-drilling screws 26 through the four pilot holes 46 of the inner bolt circle 44 directly into the crankshaft seal 52. A shop-available pneumatic air tool (driver) can be used to drive the screws 26 into the seal 52 (see FIG. 6). The next step (see FIG. 7) is to rotate the drive screw 22 in a clockwise direction which pulls the crankshaft seal 52 off of the crankshaft 55. Since all of the removal components have been aligned and centered with the crankshaft and with the crankshaft seal, this procedure moves along quickly and accurately and without any significant risks of misalignment or damage. With the seal 52 pulled off of the crankshaft, the concluding steps in the removal procedure include first unscrewing and discarding the four screws 26. The next step is to remove the two mounting cap screws 29, remove the two spacers 23, and thereafter remove the housing assembly 31, and finally remove the guide pin 24 (see FIG. 8).

If the step of inserting the four screws 26 cannot be completed because of any difficulty in driving the self-tapping screws 26 into the crankshaft seal 52, then it is recommended to use a shop drill and a 2.5 mm drill bit. The procedure involves drilling through the seal 52. This procedure helps to ease the installation of the self-tapping screws 26. It is also suggested that grease be applied to the drill bit in order to catch metal chips which are formed and thereby prevent these metal chips from entering the oil pan. Thereafter, install the four screws 26 as previously described. As will be seen, plate 33 is relieved at the comers with part-circular notches 62. The four flange portions 63 which are left each include two comer clearance holes for receipt of the two studs 34. The notches 62 provide clearance areas in order to facilitate the installation of the screws 26. If drilling is required, as described in the modified procedure, notches 62 provides clearance openings for the drill.

While not specifically part of the removal procedure for the crankshaft seal 52, once the seal is removed, the mounting surface of the corresponding housing, either the gear cover or fly wheel housing, should be cleaned. A crocus cloth is to be used in order to remove any rust or other deposits on the crankshaft. Then, use a lint-free cloth in order to remove any traces of oil from the crankshaft. Finally, check the crankshaft for any nicks, burrs, or grooves. It is to be noted that damage to the sealing surface can result in seal leakage and thus this area must be inspected.

Figure 11:
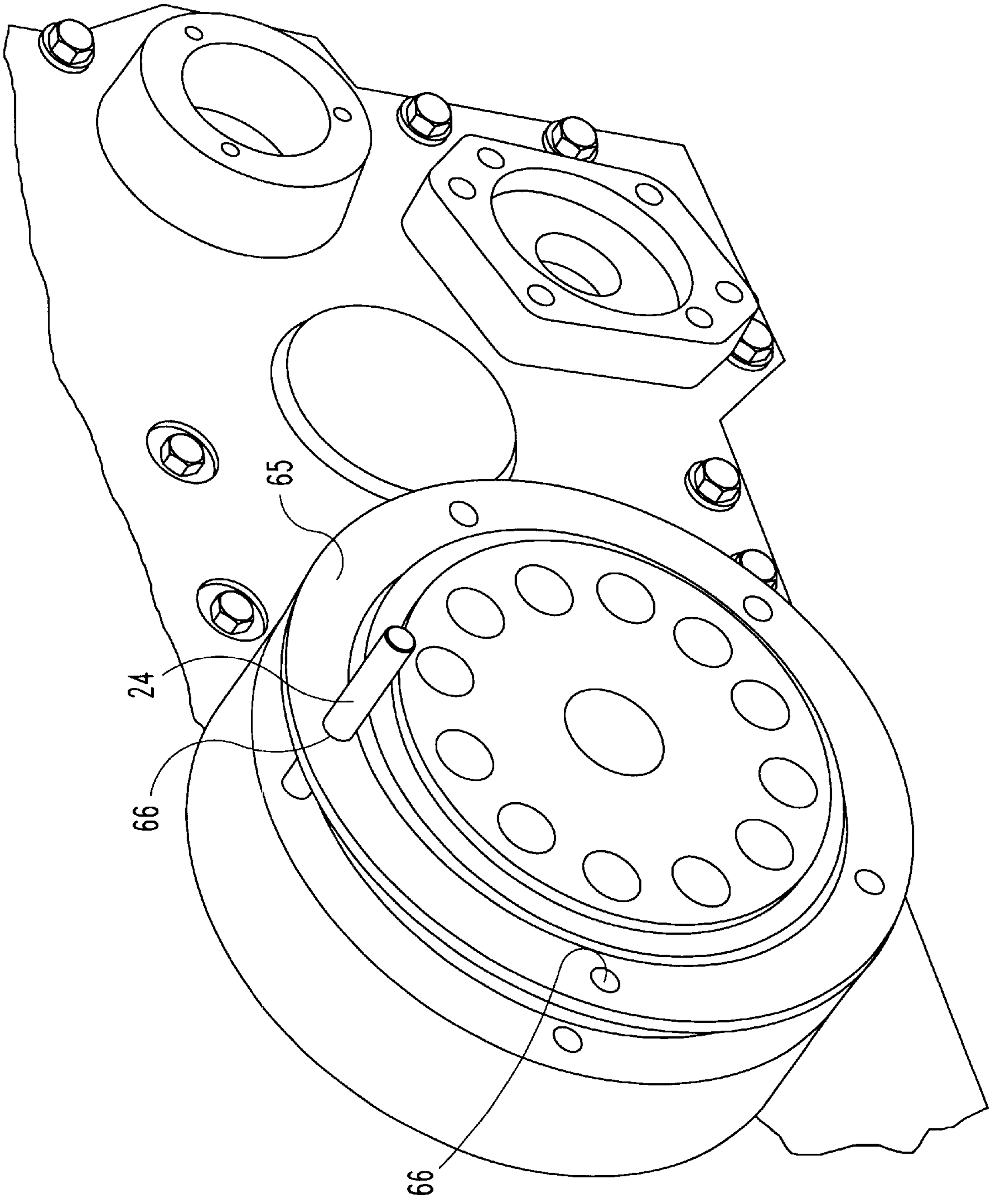
FIG. 11 is a partial, perspective, diagrammatic view showing one of the steps in the installation procedure for a new crankshaft seal according to the present invention.

When ready to install a new crankshaft seal, the installation procedure generally involves the performance of the removal steps, though in reverse order. The first step in the installation procedure is to threadedly install guide pin 24 into one of the tapped holes 51 in the corresponding housing, either the gear cover or fly wheel housing (see FIG. 10). The next step is to place the new crankshaft oil seal 65 over the crankshaft using one of the five seal holes 66 for alignment over guide pin 24 (see FIG. 11). The installation steps continue in reverse order of the removal steps. These include mounting the housing assembly 31 by using the spacers 23 and the mounting cap screws 29 and then threading the cap screws 29 into the crankshaft 55. Since the crankshaft seal 65 is going to be pushed onto the crankshaft 55, the four screws 26 are not required. The next step in the installation procedure is to simply turn the drive screw in a counterclockwise direction until the crankshaft seal is installed flush against the corresponding housing, either the gear cover or the fly wheel housing. Next, remove the housing assembly 31, the cap screws 29, and the spacers 23. Then remove the guide pin 24 and attach the crankshaft seal using the five seal mounting cap screws 53. The installation of the new crankshaft seal is then complete and the kit is stored until needed for another similar task.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A kit of tooling components for use in facilitating the removal of a crankshaft seal, said kit of tooling components also for use in facilitating the installation of a crankshaft seal, said kit comprising:

a housing assembly which is constructed and arranged for attachment to a crankshaft seal during a crankshaft seal removal procedure, said housing assembly including a housing, a support which is constructed and arranged for attaching to a crankshaft, and a drive screw threadedly received by said housing and by said support so as to connect together the housing, the support, and the drive screw; and a plurality of screws for attaching said housing assembly to said crankshaft seal which has been selected for removal wherein said drive screw is turned in one direction to remove said crankshaft seal and turned in a reverse direction to install a crankshaft seal.

2. The kit of claim 1 wherein said housing includes a ring member, a support plate, and a plurality of studs each of which is attached at a first end to said ring member and each of which is attached at a second opposite end to said support plate.

3. The kit of claim 2 wherein said support plate includes an internally-threaded portion which is constructed and arranged to threadedly receive said drive screw.

4. The kit of claim 3 wherein said drive screw includes a hex-shaped end extending beyond said support plate for use in turning said drive screw to move said ring member relative to an end of a crankshaft around which said crankshaft seal is installed.

5. The kit of claim 4 which further includes a nut and a washer for attaching said drive screw to said support.

6. The kit of claim 5 which further includes a pair of spacers for use in connecting the housing assembly to the crankshaft.

7. The kit of claim 6 wherein each screw of said plurality of screws is a self-tapping screw.

8. The kit of claim 2 wherein said drive screw includes a hex-shaped end extending beyond said support plate for use in turning said drive screw to move said ring member relative to an end of a crankshaft around which said crankshaft seal is installed.

9. The kit of claim 8 which further includes a nut and a washer for attaching said drive screw to said support.

10. The kit of claim 9 which further includes a pair of spacers for use in connecting the housing assembly to the crankshaft.

11. The kit of claim 1 which further includes a nut and a washer for attaching said drive screw to said support.

12. The kit of claim 1 wherein each screw of said plurality of screws is a self-tapping screw.

13. The kit of claim 1 which further includes a guide pin which is constructed and arranged for insertion through a crankshaft seal for alignment of said crankshaft seal as it moves during a crankshaft removal procedure and as it moves during a crankshaft seal installation procedure.

* * * * *